US010216428B1

(12) United States Patent
Chinnam (10) Patent No.: US 10,216,428 B1
(45) Date of Patent: Feb. 26, 2019

(54) BATCH CONFIGURATION OF VIRTUAL DATA STORAGE DEVICES

(71) Applicant: EMC Corporation, Hopkinton, MA (US)

(72) Inventor: Shobhan K. Chinnam, Cupertino, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 288 days.

(21) Appl. No.: 14/671,654

(22) Filed: Mar. 27, 2015

(51) Int. Cl.
*G06F 13/00* (2006.01)
*G06F 3/06* (2006.01)

(52) U.S. Cl.
CPC .......... *G06F 3/0619* (2013.01); *G06F 3/0665* (2013.01); *G06F 3/0689* (2013.01); *G06F 2003/0692* (2013.01)

(58) Field of Classification Search
CPC . G06F 12/00; G06F 13/00; G06F 7/00; G11C 29/00; H04L 12/911
See application file for complete search history.

(56) References Cited

U.S. PATENT DOCUMENTS

| | | | | |
|---|---|---|---|---|
| 8,346,735 B1* | 1/2013 | Tang | ................... | G06F 11/1474 707/675 |
| 8,407,191 B1* | 3/2013 | Nanda | ............... | G06F 17/30156 707/654 |
| 2008/0120463 A1* | 5/2008 | Ashmore | .............. | G06F 3/0613 711/114 |
| 2008/0183965 A1* | 7/2008 | Shiga | ................... | G06F 3/0605 711/114 |

* cited by examiner

*Primary Examiner* — Charles Rones
*Assistant Examiner* — Han V Doan
(74) *Attorney, Agent, or Firm* — Womble Bond Dickinson (US) LLP (57) ABSTRACT

A system for a storage controller configuration system of a storage server comprises an input interface and a storage controller request creator. The input interface is for receiving one or more commands to instantiate a set of virtual storage devices. The storage controller request creator for: 1) providing instantiation instructions for the set of virtual storage devices for storage in a cache and 2) in the event a request is received to create a mapping between a virtual storage device of the set of storage devices, a LUN, a port, and a client initiator: providing an instantiation indication to instantiate the set of virtual storage devices and providing a storing indication to store the mapping in a LUN table.

20 Claims, 7 Drawing Sheets

BATCH CONFIGURATION OF VIRTUAL DATA STORAGE DEVICES

BACKGROUND OF THE INVENTION

When virtual data storage devices of a data storage server are created, deleted, or modified, data communications activity has to be suspended. Typically, these operations are serialized, causing data communications activity to be suspended for a long period of time (e.g., minutes) and providing poor customer experience as a long delay is seen in the ongoing backups. In a worst-case situation, extended suspension of data communications activity results in failure of backups.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for a storage controller configuration system of a storage server. The system comprises an input interface for receiving one or more commands to instantiate a set of virtual storage devices. The system comprises a storage controller request creator for providing instantiation instructions for the set of virtual storage devices for storage in a cache, and in the event a request is received to create a mapping between a virtual storage device of the set of storage devices, a logical unit (e.g., a LUN), a port, and a client initiator: providing an instantiation indication to instantiate the set of virtual storage devices, and providing a storing indication to store the mapping in a LUN table.

In some embodiments, a system for a storage controller configuration system of a storage server comprises a system for configuring a storage controller of a storage system. In various embodiments, configuration information is received from a user via a user interface, from a stored configuration file, or from any other appropriate manner. In some embodiments, configuring a storage controller of a storage system comprises indicating a set of virtual storage devices for instantiation on a storage device. In some embodiments, configuring a storage controller of a storage system comprises indicating a set of mappings from a connection to one or more virtual storage devices on the device storage (e.g., a connection that includes a connecting system and a port). In some embodiments, a connecting system connecting on a port only has access to the one or more virtual storage devices on the device storage indicated by the mapping. When a storage controller is configured, the storage controller configuration system provides the storage controller with instantiation instructions for the set of virtual storage devices. Rather than instantiating the virtual storage devices from the instantiation instructions as they are received, the instantiation instructions are stored on the storage controller in a cache. After all instantiation instructions have been provided to the storage controller, one or more indications of mappings need to be set up to provide access to the virtual storage devices. When a first mapping is received by the storage controller configuration system to be provided to the storage controller, the storage controller configuration system first provides the storage controller with an indication that the set of virtual storage devices should be instantiated from the instantiation instructions stored in the cache. The set of virtual storage devices can be instantiated all at once with no further communication necessary by the storage controller. After the set of virtual storage devices has been instantiated, the mapping is stored in a LUN table on the storage controller. Any further mappings to create are provided by the storage controller configuration system to the storage controller and stored in the LUN table. Because the storage server behaves as busy and disrupts backups during the time a virtual storage device is being instantiated, reducing the total instantiation time minimizes the disruptions to backups and improves overall appliance/product performance. Instantiating the set of storage devices from a cached set of instructions greatly reduces total instantiation time compared with a storage server instantiating the virtual storage devices one at a time.

Figure 1:
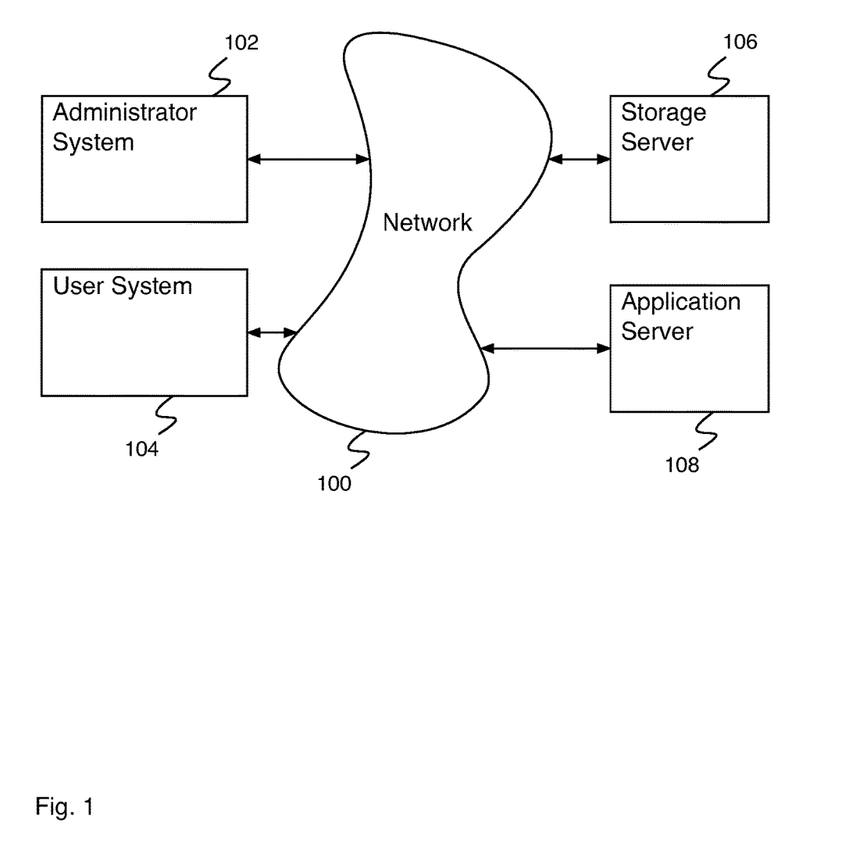
FIG. 1 is a block diagram illustrating an example of an embodiment of a network system.

FIG. 1 is a block diagram illustrating an example of an embodiment of a network system. In the example shown, administrator system 102, user system 104, storage server 106, and application server 108 communicate with one another via network 100. In various embodiments, network 100 comprises one or more of the following: a local area network, a wide area network, a wired network, a wireless network, the Internet, an intranet, a storage area network, or any other appropriate communication network. In various embodiments, administrator system 102, user system 104, storage server 106, and application server 108 and subsets thereof are in physical proximity to one another (e.g., in the same building, in the same room, etc.) or are physically remote from one another (e.g., in separate buildings of a campus, in separate locations of a business, at separate offices of a collaboration between organizations, in separate countries, etc.). In various embodiments, the processors comprising administrator system 102, user system 104, storage server 106, and application server 108 comprise any one of a variety of proprietary or commercially available single or multi-processor systems (e.g., an Intel-based processor) or other type of commercially available processor able to support communications in accordance with each particular embodiment and application. In various embodiments, the network system comprises any appropriate number of administrator systems (e.g., as in administrator system 102), user systems (e.g., as in user system 104), storage servers (e.g., as in storage server 106), and application servers (e.g., as in application server 108).

Administrator system 102 comprises a system accessed by an administrator for administrating the network system of FIG. 1 or subsets of the network system of FIG. 1. In various embodiments, administrating the network system of FIG. 1 comprises configuring user system 104 (e.g., configuring application settings, network settings, security settings, etc.), configuring application server 108 (e.g., configuring applications, user settings, security settings, network settings, etc.), configuring storage server 106 (e.g., configuring storage devices, storage device mappings, storage device ports, backup schedules, security settings, etc.), configuring hardware comprising network 100, or administering any other appropriate attributes of the network system of FIG. 1. User system 104 comprises a system accessed by a user for accessing the network system of FIG. 1. In various embodiments, a user accesses the network system of FIG. 1 to store data, access data, backup data, execute applications, communicate with other users, or for any other appropriate purpose. Application server 108 comprises an application server for providing applications for use via the network system of FIG. 1. Storage server 106 comprises a storage server for storing data accessible via the network system of FIG. 1. In some embodiments, storage server 106 comprises a storage server for storing backup data. In some embodiments, storage server 106 comprises a plurality of virtual backup devices. In some embodiments, storage server 106 comprises a plurality of ports. In some embodiments, storage server 106 comprises a plurality of mappings (e.g., mapping a particular system connecting to storage server 106 via a particular port to a particular virtual backup device). In some embodiments, a mapping is associated with a backup logical unit (e.g., a LUN) stored in a LUN table. In some embodiments, storage server 106 comprises a deduplicating storage server. In some embodiments, storage server 106 comprises a storage server that stores files as collections of file segments. In some embodiments, storage server 106 comprises a storage server that stores files as collections of file segments, where for a given file a segment reference is stored in place of a duplicate segment that has already been stored for another file.

Figure 2:
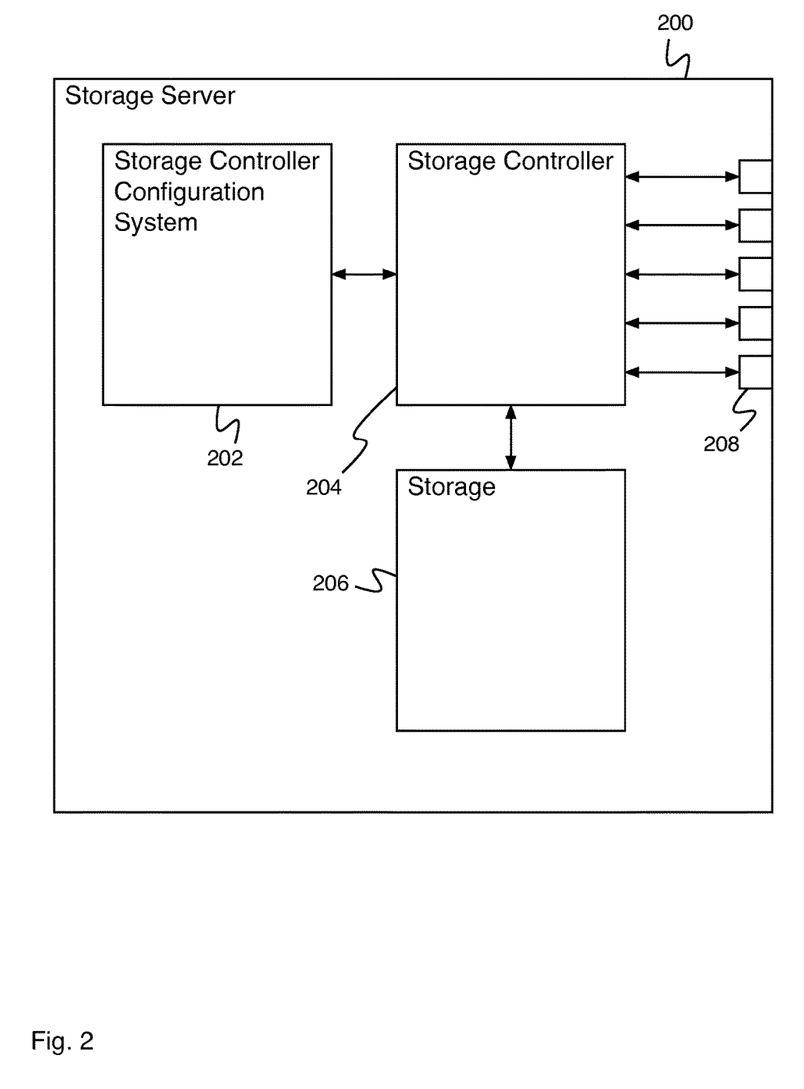
FIG. 2 is a block diagram illustrating an embodiment of a storage server.

FIG. 2 is a block diagram illustrating an embodiment of a storage server. In some embodiments, storage server 200 comprises storage server 106 of FIG. 1. In the example shown, storage server comprises storage 206. In various embodiments, storage 206 comprises a disk drive, a tape drive, a magnetic drive, an optical drive, a drive library, a boost over fiber channel device, or any other appropriate storage. In some embodiments, storage 206 comprises a plurality of virtual storage devices. Storage server 200 comprises storage controller 204. In various embodiments, storage controller 204 controls reading and writing on storage 206, storage controller 204 controls access to virtual storage devices comprising storage 206, storage controller 204 maintains a LUN table, storage controller 204 stores a configuration cache, or storage controller 204 performs any other appropriate storage control function. In some embodiments, storage controller 204 comprises a small computer system interface (e.g., SCSI) controller. Storage server 200 additionally comprises a plurality of ports (e.g., port 208). In some embodiments, ports comprise physical ports for connection of communications hardware (e.g., network cables, etc.). In some embodiments, ports comprise virtual ports for distinguishing the communications of network traffic (e.g., physical ports are subdivided into a plurality of virtual ports, and network traffic is associated with a virtual port within its physical port). In some embodiments, a LUN table comprises a set of mappings, wherein each mapping maps a connecting system (e.g., a system connecting to storage server 200 via the network) and its associated port (e.g., physical port and/or virtual port) to one or more virtual storage devices (e.g., virtual storage device(s) of storage 206). In some embodiments, a connecting system is only allowed by storage controller 204 to access the one or more virtual storage devices mapped to it in the LUN table. In some embodiments, storage controller 204 provides an indication to storage 206 to instantiate a virtual storage device. In some embodiments, while a virtual storage device is being instantiated by storage 206, communication into and out of storage server 200 (e.g., via the plurality of ports) is suspended. Storage server 200 comprises storage controller configuration system 202. In some embodiments, storage controller configuration system 202 comprises a system for providing configuration commands to storage controller 204. In various embodiments, storage controller configuration system receives configuration information via a user interface (e.g., via a command line interface or a graphical interface, etc.) or receives configuration information via a stored configuration. In various embodiments, storage controller configuration system 202 provides commands to storage controller 204 indicating a virtual storage device to instantiate (e.g., on storage 206), indicating virtual storage device information for instantiation at a later point (e.g., virtual storage device information for storing in a cache and instantiating upon an indication), indicating to instantiate virtual storage devices indicated in the cache, indicating a mapping to create (e.g., to store in the LUN table), or indicating any other appropriate storage controller action.

Figure 3:
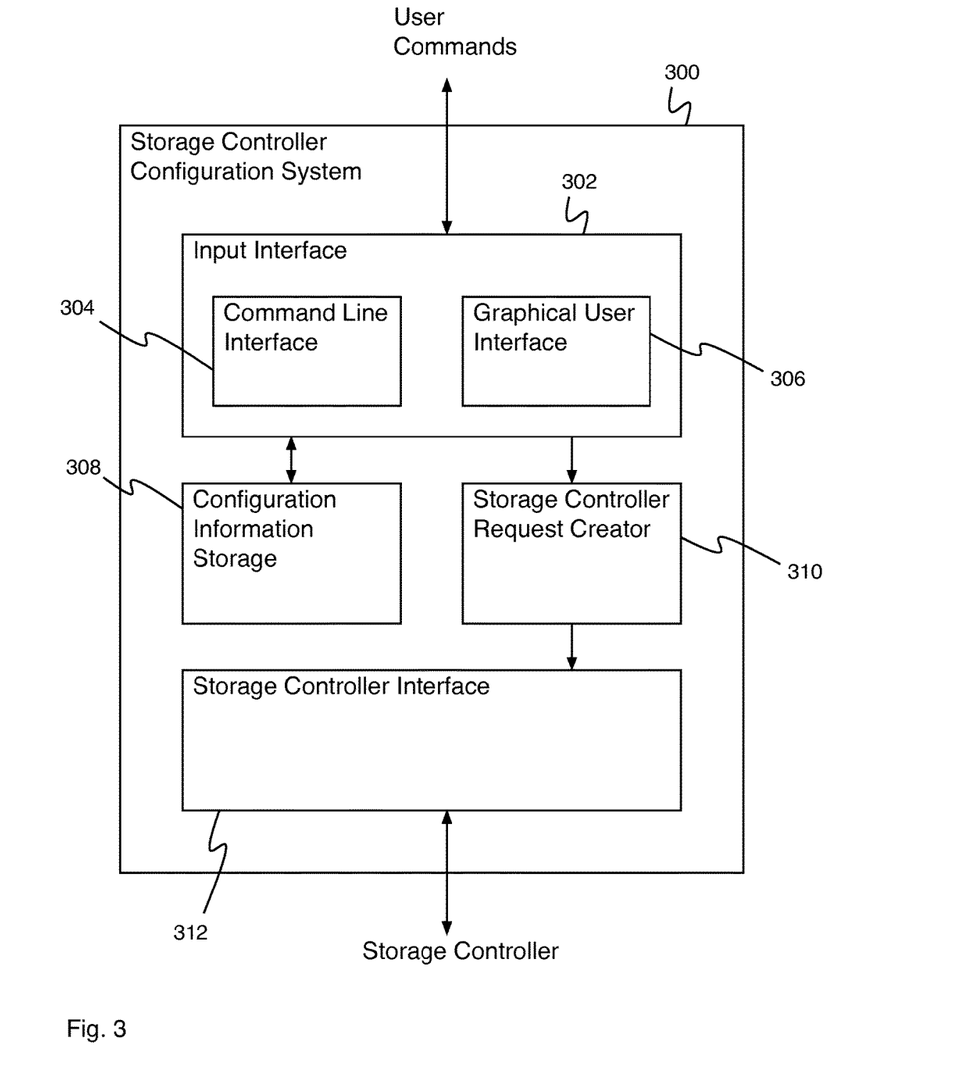
FIG. 3 is a block diagram illustrating an embodiment of a storage controller configuration system.

FIG. 3 is a block diagram illustrating an embodiment of a storage controller configuration system. In some embodiments, storage controller configuration system 300 of FIG. 3 comprises storage controller configuration system 202 of FIG. 2. In the example shown, storage controller configuration system 300 comprises input interface 302. Input interface 302 comprises an input interface for receiving input commands (e.g., via command line interface 304 and graphical user interface 306). In the example shown, input interface 302 comprises an input interface for receiving input commands from configuration information storage 308. Configuration information storage comprises a storage (e.g., a set of stored data) for storing a set of input commands (e.g., so they do not need to be input by a user every time storage controller configuration system 300 is restarted). In some embodiments, input interface 302 stores received commands in configuration information storage 308. In some embodiments, input commands are provided to storage controller request creator 310. In some embodiments, storage controller request creator 310 comprises a system for determining commands for a storage controller. In some embodiments, commands for a storage controller are determined based at least in part on input commands received from input interface 302. Commands determined by storage controller request creator 310 are provided to a storage controller via storage controller interface 312.

Figure 4:
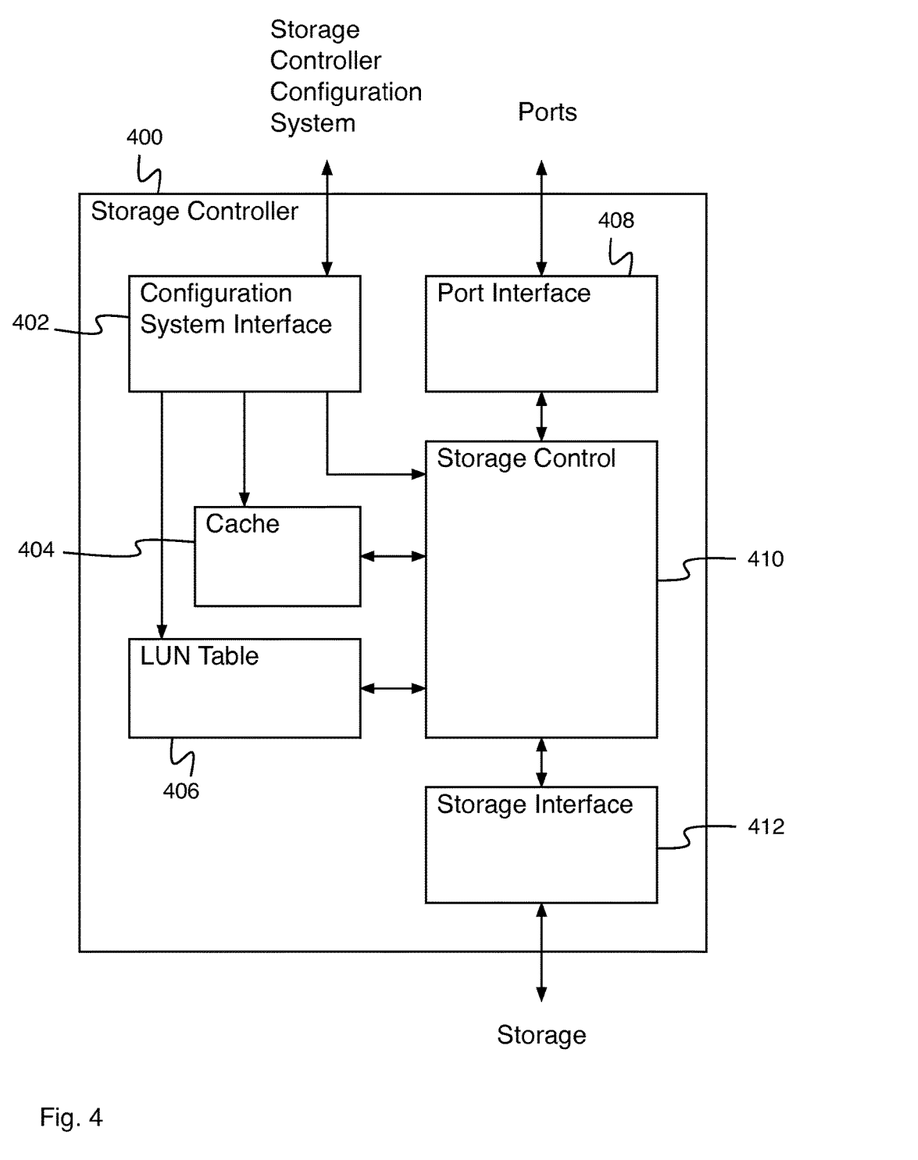
FIG. 4 is a block diagram illustrating an embodiment of a storage controller.

FIG. 4 is a block diagram illustrating an embodiment of a storage controller. In some embodiments, storage controller 400 comprises storage controller 204 of FIG. 2. In the example shown, storage controller 400 comprises configuration system interface 402. Configuration system interface 402 comprises an interface for receiving commands from a storage controller configuration system. In some embodiments, configuration system interface 402 provides commands received from a storage controller configuration system to cache 404, LUN table 406, and storage control 410. Configuration system interface 402 provides commands indicating a virtual storage device to instantiate and indicating to instantiate virtual storage devices indicated in the cache 404 to storage control 410. Configuration system interface 402 provides commands indicating virtual storage device information for instantiation at a later point to cache 404. Configuration system interface 402 provides commands indicating a mapping to create in LUN table 406. Storage controller 400 comprises port interface 408 for receiving data from ports. In various embodiments, data received via ports comprises data to write to storage, a request data indicating to read data from storage, data indicating configuration information, or any other appropriate data. Storage control 410 comprises a control for providing commands and data to a storage via storage interface 412. In some embodiments, storage control 410 determines a virtual storage device of a storage (e.g., a storage device or unit) based at least in part on a mapping stored in LUN table 406. In some embodiments, storage control indicates to instantiate a virtual storage device based at least in part on data stored in cache 404 or received from configuration system interface 402.

Figure 5:
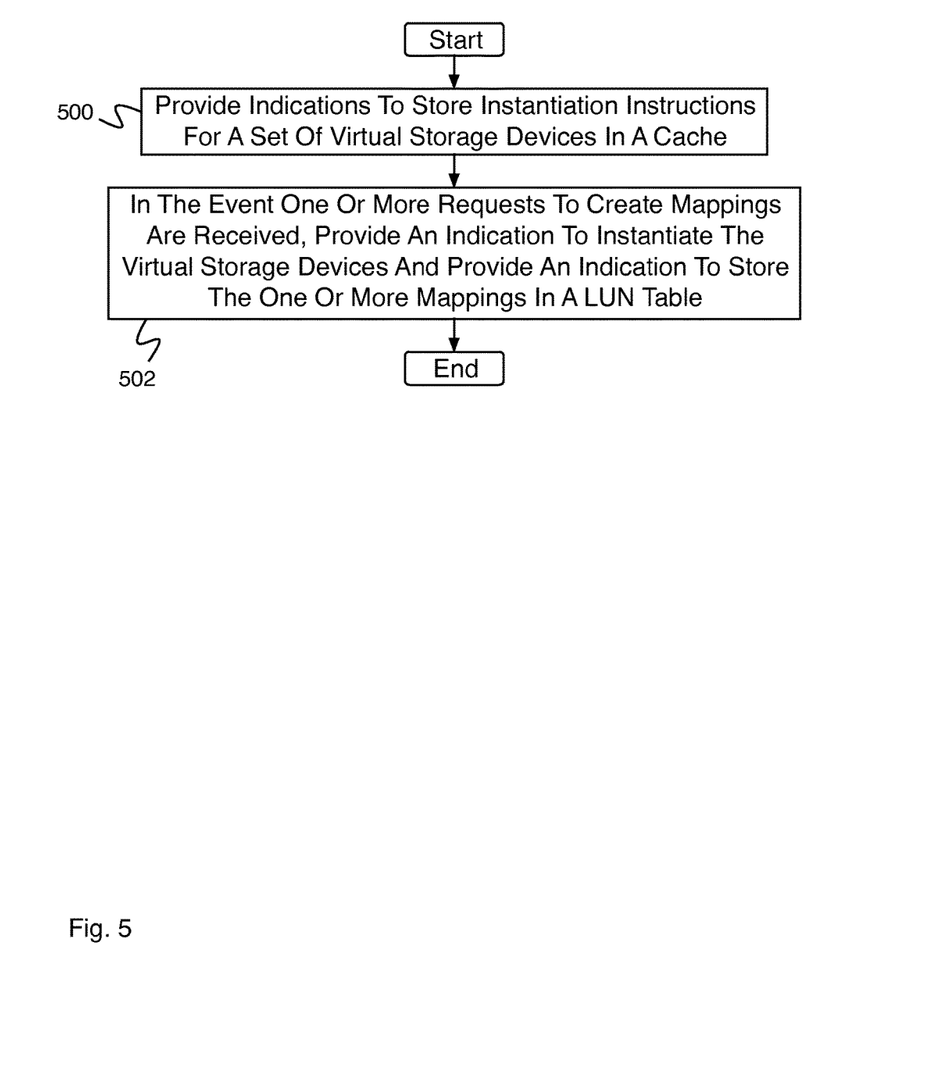
FIG. 5 is a flow diagram illustrating an embodiment of a process for instantiating a set of storage devices.

FIG. 5 is a flow diagram illustrating an embodiment of a process for instantiating a set of storage devices. In some embodiments, the process of FIG. 5 is executed by a storage controller configuration system (e.g., storage controller configuration system 202 of FIG. 2). In the example shown, in 500, indications are provided to store instantiation instructions for a set of virtual storage devices in a cache. In 502, in the event one or more requests to create mappings are received, an indication to instantiate the virtual storage devices is provided and an indication to store the one or more mappings in a LUN table is provided.

Figure 6:
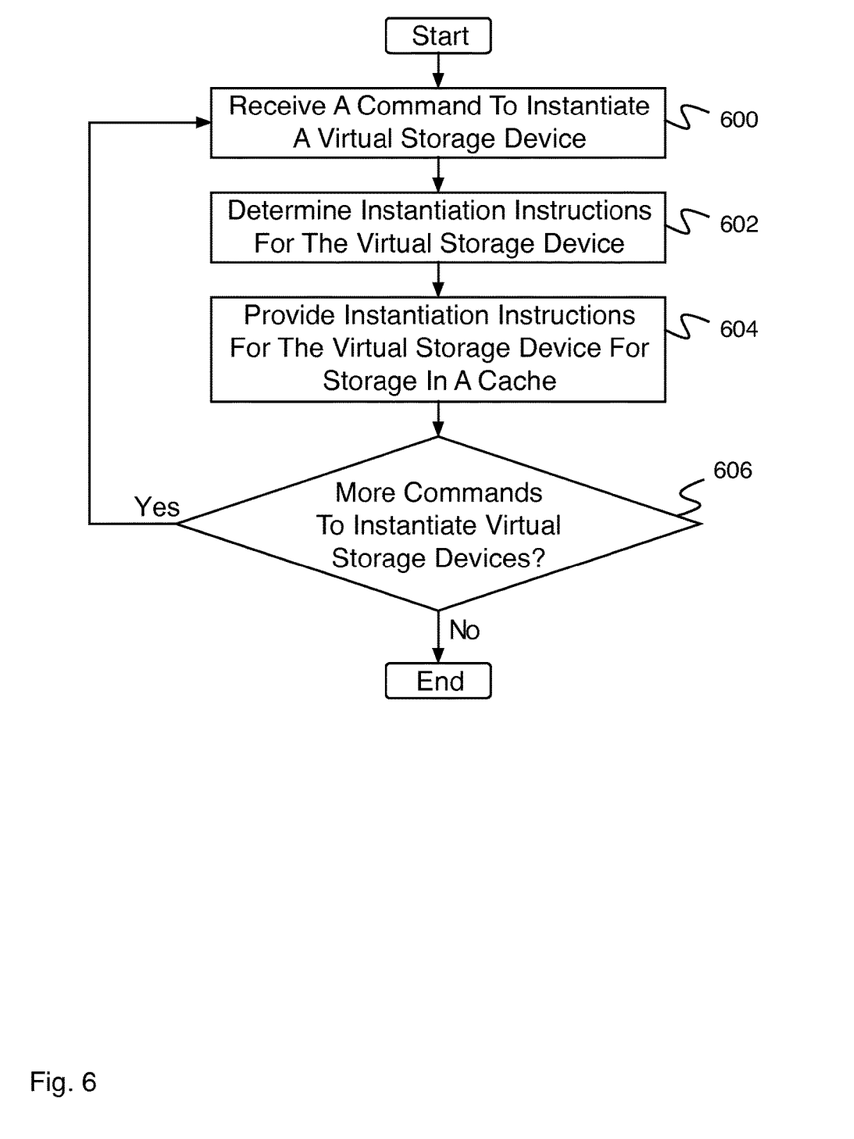
FIG. 6 is a flow diagram illustrating an embodiment of a process for providing indications to store instantiation instructions for a set of virtual storage devices in a cache.

FIG. 6 is a flow diagram illustrating an embodiment of a process for providing indications to store instantiation instructions for a set of virtual storage devices in a cache. In some embodiments, the process of FIG. 6 implements 500 of FIG. 5. In the example shown, in 600, a command to instantiate a virtual storage device is received. For example, a command is received to instantiate a virtual storage device from an input interface. In 602, instantiation instructions for the virtual storage device are determined. In 604, the instantiation instructions for the virtual storage device are provided for storage in a cache. In 606, it is determined whether there are more commands to instantiate virtual storage devices. In the event that there are more commands, then control passes to 600. In the even that there are not more commands, then the process ends.

Figure 7:
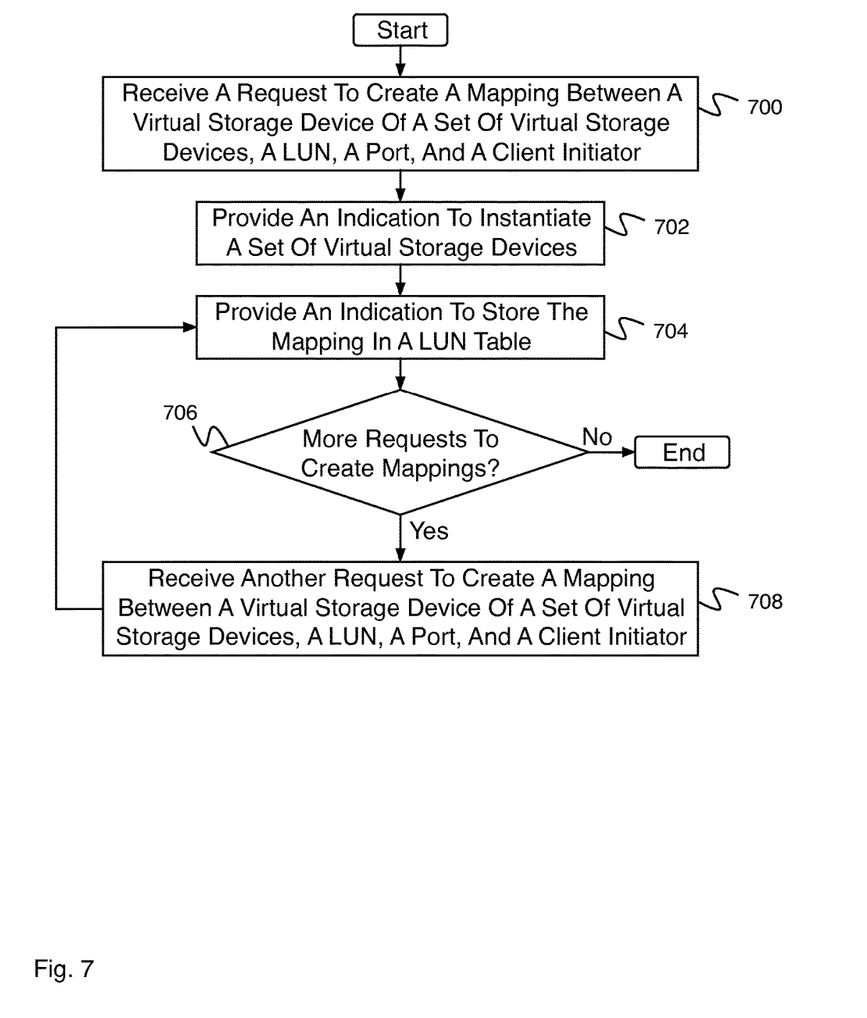
FIG. 7 is a flow diagram illustrating an embodiment of a process for, in the event one or more requests to create mappings are received, providing an indication to instantiate the virtual storage devices and providing an indication to store the one or more mappings in a LUN table.

FIG. 7 is a flow diagram illustrating an embodiment of a process for, in the event one or more requests to create mappings are received, providing an indication to instantiate the virtual storage devices and providing an indication to store the one or more mappings in a LUN table. In some embodiments, the process of FIG. 7 implements 502 of FIG. 5. In the example shown, in 700, a request is received to create a mapping between a virtual storage device of a set of virtual storage devices, a LUN, a port, and a client initiator. In some embodiments, a client initiator comprises a system contacting the storage system to access a virtual storage device. In 702, an indication is provided to instantiate a set of virtual storage devices. In some embodiments, the indication comprises an indication to instantiate a set of virtual storage devices from instantiation instructions stored in a cache. In some embodiments, all virtual storage devices with instantiation instructions stored in the cache are instantiated in response to the indication. In 704, an indication to store the mapping in a LUN table is provided. In 706, it is determined whether there are more requests to create mappings. In the event it is determined that there are no more requests to create mappings, the process ends. In the event it is determined that there are more requests to create mappings, control passes to 708. In 708, another request is received to create a mapping between a virtual storage device of a set of virtual storage devices, a LUN, a port, and a client initiator. Control then passes to 704. In some embodiments, requests to create mappings are received via a user interface (e.g., manually entered by a user). In some embodiments, requests to create mappings are received via stored configuration information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage controller configuration system of a storage server, comprising:
   an input interface for receiving one or more commands to instantiate a set of virtual storage devices; and
   a storage controller configured to perform request creation operations including:
      providing instantiation instructions for the set of virtual storage devices, the instantiation instructions to be stored in a cache on the storage controller, wherein the instructions are provided at a time of configuration of the storage controller and stored prior to receiving an indication to instantiate the set of virtual storage devices, and wherein the indication to instantiate the set of virtual storage devices is withheld irrespective of provision of the instantiation instructions until a request to create a mapping between a virtual storage device of the set of storage devices, a logical unit number (LUN), a port, and a client initiator is received; and in the event the request to create the mapping is received:
   in response to receiving the request to create the mapping, providing the instantiation indication to instantiate all of the set of virtual storage devices at once using the instructions stored in the cache on the storage controller; and
   providing a storing indication to store the mapping in a LUN table.

2. The system of claim 1, wherein the one or more commands are received using a command line interface or graphical user interface.

3. The system of claim 1, wherein the one or more commands are received from a stored configuration.

4. The system of claim 1, wherein the storage server comprises a deduplicating storage server.

5. The system of claim 1, wherein the storage server stores files as collections of segments.

6. The system of claim 5, wherein the storage server stores a segment reference in place of a duplicate segment.

7. The system of claim 1, wherein a virtual storage device of the set of virtual storage devices comprises a disk drive.

8. The system of claim 1, wherein a virtual storage device of the set of virtual storage devices comprises a tape drive.

9. The system of claim 1, wherein a virtual storage device of the set of virtual storage devices comprises a boost over fiber channel drive.

10. The system of claim 1, wherein the mapping comprises one of a plurality of mappings.

11. The system of claim 1, wherein the mapping comprises one or more of the following: a device identifier or a LUN identifier.

12. The system of claim 1, wherein the mapping comprises a port identifier.

13. The system of claim 1, wherein the mapping comprises a client initiator identifier.

14. The system of claim 1, wherein the storage controller request creator is configured to perform further operations including: in the event that one or more additional requests are received to create mappings, providing an indication to store each mapping of the set of mappings, wherein each mapping is between a virtual storage device of the set of storage devices, a LUN, a port, and a client initiator.

15. The system of claim 1, wherein the cache is stored by the storage controller.

16. The system of claim 1, wherein the LUN table is stored by the storage controller.

17. The system of claim 1, wherein the storage controller comprises a SCSI controller.

18. The system of claim 1, wherein the instantiation indication to instantiate all of the set of virtual storage devices at once is provided in response to receiving a first mapping between a first one of the virtual storage devices, a LUN, a port, and a client initiator.

19. A method for an interface of a storage server, comprising:
   receiving one or more commands to instantiate a set of virtual storage devices;
   storing instantiation instructions for the set of virtual storage devices in a cache on a storage controller for the set of virtual storage devices, wherein the instructions are provided at a time of configuration of the storage controller and stored prior to receiving an indication to instantiate the set of virtual storage devices, and wherein the indication to instantiate the set of virtual storage devices is withheld irrespective of provision of the instantiation instructions until a request to create a mapping between a virtual storage device of the set of virtual storage devices, a logical unit number (LUN), a port, and a client initiator is received; and
   in the event the request to create the mapping is received:
      in response to receiving the request to create the mapping, providing, using a processor, the instantiating indication to instantiate all of the set of virtual storage devices at once using the instructions stored in the cache on the storage controller; and
      providing a storing indication to store the mapping in a LUN table.

20. A computer program product for an interface of a storage server, the computer program product being embodied in a non-transitory computer readable storage medium and comprising computer instructions for:
   receiving one or more commands to instantiate a set of virtual storage devices;
   storing instantiation instructions for the set of virtual storage devices in a cache on a storage controller for the set of virtual storage devices, wherein the instructions are provided at a time of configuration of the storage controller and stored prior to receiving an indication to instantiate the set of virtual storage devices, and wherein the indication to instantiate the set of virtual storage devices is withheld irrespective of provision of the instantiation instructions until a request to create a mapping between a virtual storage device of the set of virtual storage devices, a logical unit number (LUN), a port, and a client initiator is received; and
   in the event the request to create the mapping is received:
      in response to receiving the request to create the mapping, providing the instantiation indication to instantiate all of the set of virtual storage devices at once using the instructions stored in the cache on the storage controller; and
      providing a storing indication to store the mapping in a LUN table.

* * * * *